Aug. 11, 1953 W. E. JONES ET AL 2,648,361
JOINING PRESS
Filed Nov. 2, 1948 3 Sheets-Sheet 1
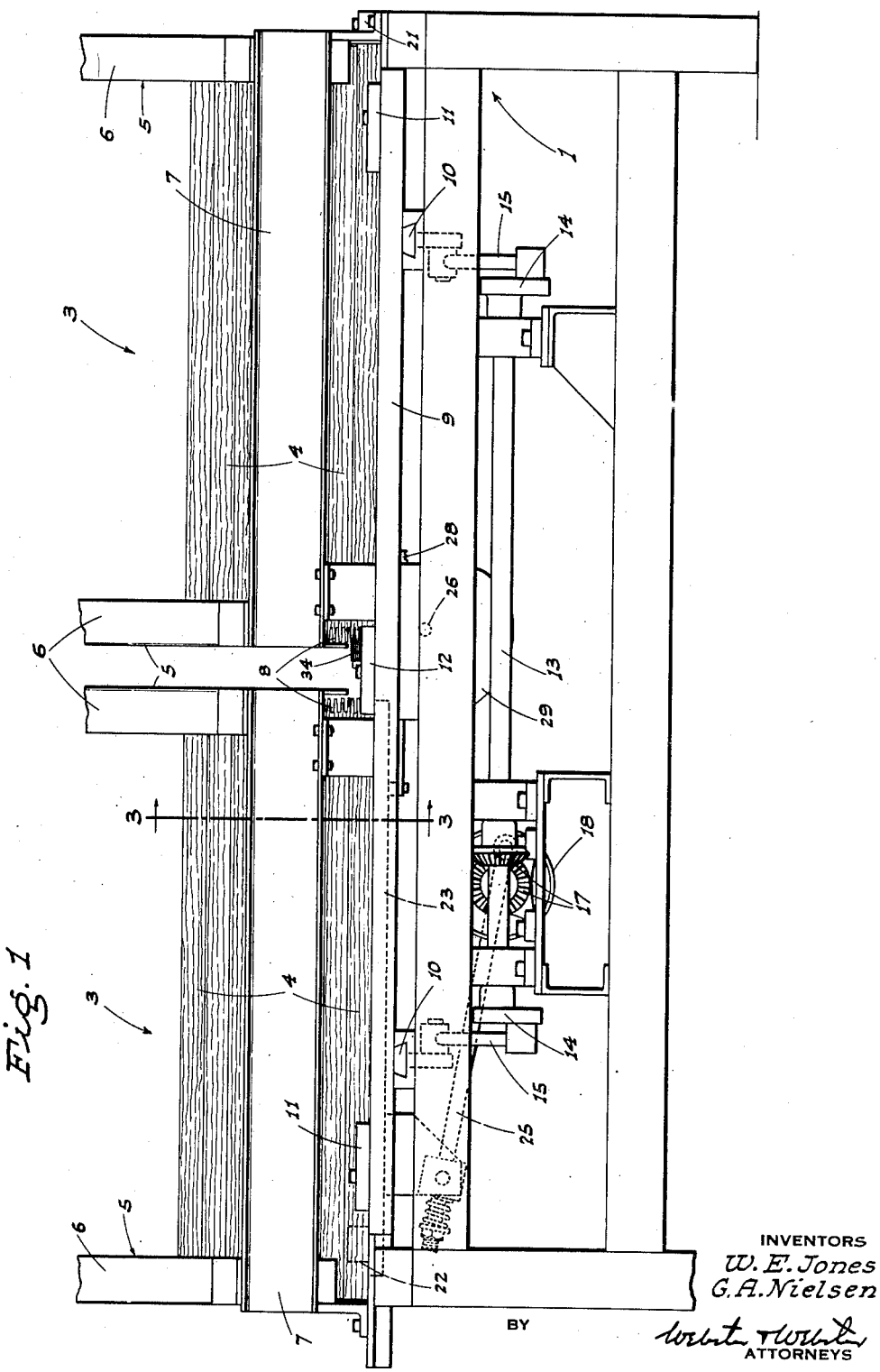
INVENTORS
W. E. Jones
G. A. Nielsen
BY
ATTORNEYS

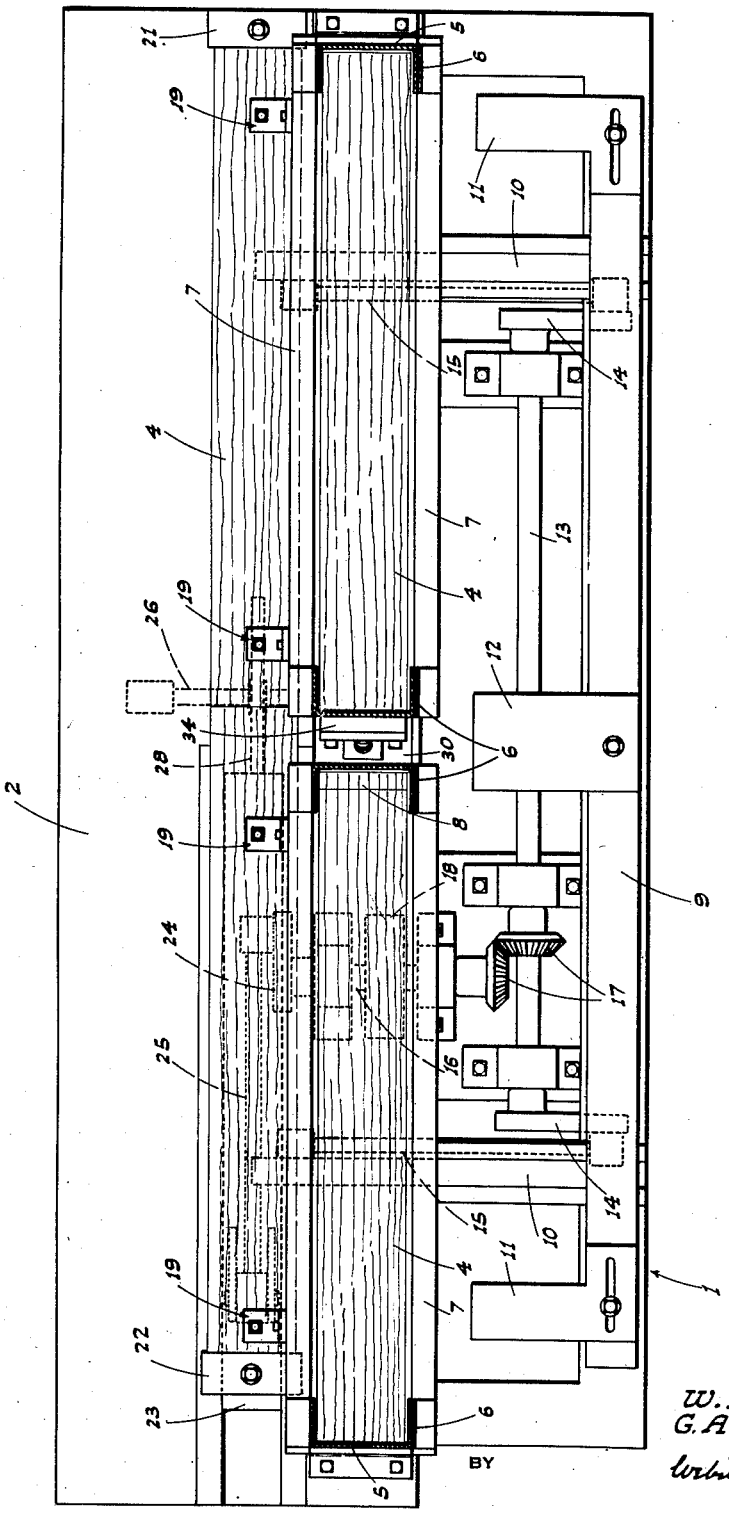

Aug. 11, 1953 — W. E. JONES ET AL — 2,648,361
JOINING PRESS
Filed Nov. 2, 1948 — 3 Sheets-Sheet 3
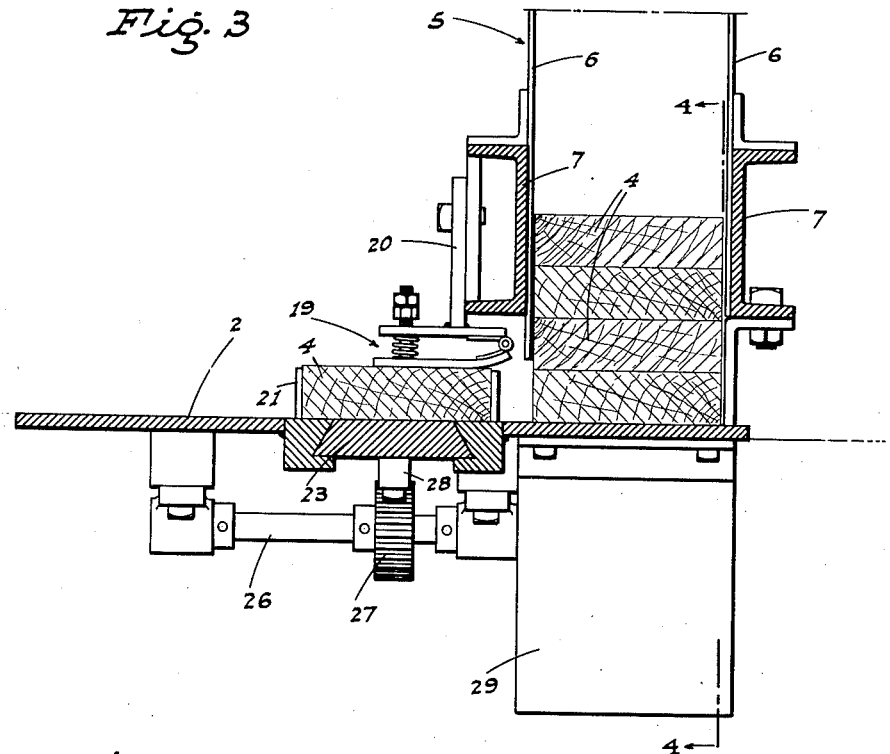
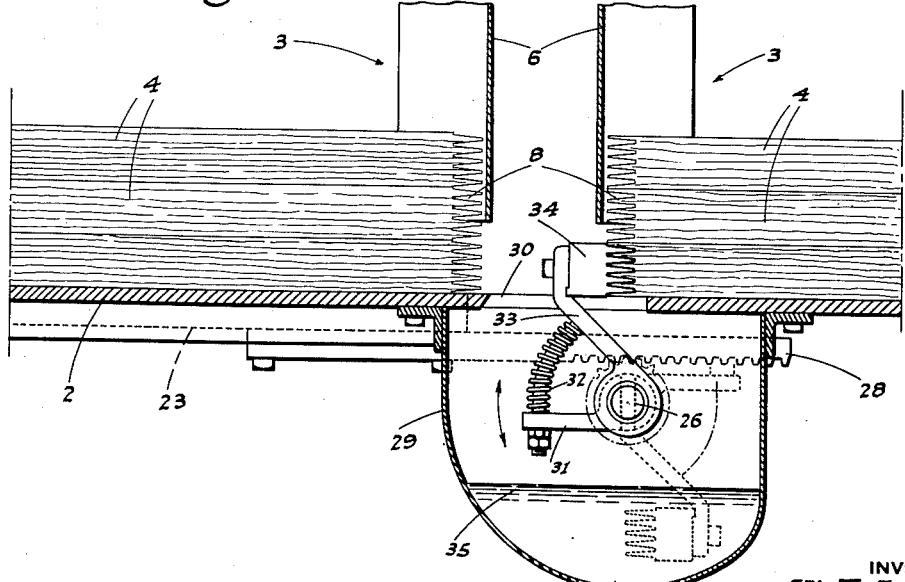
INVENTORS
W. E. Jones
G. A. Nielsen
BY
ATTORNEYS Patented Aug. 11, 1953

2,648,361

UNITED STATES PATENT OFFICE 2,648,361

JOINING PRESS

Walter E. Jones and Gordon A. Nielsen, Roseville, Calif., assignors to Jones Steel Products, Inc., Roseville, Calif., a corporation of Nevada Application November 2, 1948, Serial No. 57,848

2 Claims. (Cl. 144—279)

1

This invention is directed to, and it is an object to provide, an automatic machine—of novel construction and operation—for connecting or joining lumber pieces in alined end to end relation preparatory to milling the resultant unitary piece to shape.

Another object of the invention is to provide a joining press which is designed particularly to enable short pieces of lumber to be effectively and rigidly combined to make a single length of lumber suitable for milling into door stiles, etc. and thereby salvaging lumber otherwise discarded or at best of little value.

A further object of the invention is to provide a joining press, for the purpose described, which includes novel cycling between the advancing mechanism for the board pieces, the glue applying device, and the ram mechanism which forcefully joins the board pieces after application of the glue.

An additional object of the invention is to provide a joining press, for board pieces, which is relatively simple in structure but rugged and smooth operating, requiring a minimum of maintenance and repair.

A further object of the invention is to provide a practical and reliable joining press and one which will be exceedingly effective for the purpose for which it is designed.

These objects are accomplished by means of such structure and relative arrangement of parts as will fully appear by a perusual of the following specification and claims.

In the drawings:

Fig. 1 is a side elevation of the machine, with the parts in the positions occupied when the glue applying device and ram mechanism are advanced.

Fig. 2 is a plan view of the same.

Fig. 3 is an enlarged cross section taken on line 3—3 of Fig. 1.

Fig. 4 is a fragmentary sectional elevation on line 4—4 of Fig. 3, showing particularly the glue applying device.

Referring now more particularly to the characters of reference on the drawings, the joining press comprises a rigid, upstanding main frame, indicated generally at 1, which is elongated, and on top thereof said frame supports a horizontal table 2, likewise elongated.

Above the table 2 the press includes a pair of upstanding, longitudinally extending, lateral feed hoppers disposed in end to end alinement, but spaced apart a short distance at adjacent ends; the hoppers 3 being formed for the reception of elongated boards 4 in stacks, with the lowermost boards of each stack resting on the table 2 for said lateral feed.

The hoppers 3 include facing end channels 5 having side flanges 6, and horizontal side beams 7 extend between said end channels 5 adjacent but short of the bottom of each hopper; the assembly of the channels 5 and beams 7 being supported from the table 2 and main frame 1 by suitable foot framing. The lowermost or table supported pair of boards 4 are recurringly advanced or fed from the hoppers 3 laterally in a left hand direction on the table 2 by the mechanism, and for the purpose, hereafter described.

Adjacent ends of the boards 4 in the hoppers 3 are tongued and grooved, as at 8, whereby said adjacent ends of alined boards may be connected, by finger jointing, upon forceful engagement of said tongued and grooved ends.

The following mechanism is employed to simultaneously advance, at intervals, the two lowermost boards 4 from the hoppers 3 laterally to the left on the table 2.

The table 2 extends mainly laterally to the left of the hoppers 3 on the main frame 1, and to the right of such hoppers there is a longitudinal pusher bar 9 mounted by slides 10 for reciprocating motion in a direction transversely of the table 2, i. e. toward and thence away from the hoppers 3. The pusher bar 9 includes end pusher plates 11 and a central pusher plate 12 projecting laterally toward the hoppers 3 in the plane of the lowermost pair of boards 4.

On advance of the pusher bar 9 in a direction transversely of the table 2, the pusher plates 11 and 12 engage said lowermost pair of boards 4 and advance them from the hopper laterally to the left on the table 2 to a position clear of such hoppers, and thence the pusher bar 9 is retracted to its starting position. The pusher plates 11 are adjustable lengthwise of the bar 9, whereas the pusher plate 12 is non-adjustable but disposed so as to engage adjacent end portions of the pair of boards being advanced.

A longitudinal shaft 13 is journaled in the main frame 1 in a plane below the table 2, and said shaft is fitted, at opposite ends, with cranks 14 which drive connecting rods 15 attached to the slides 10.

The longitudinal shaft 13 is driven from a cross shaft 16, in the main frame 1, by means of bevel gears 17. The cross shaft 16 is driven by a suitable power means including a pulley, indicated at 18.

With the described arrangement, the pusher bar 9 constantly reciprocates, recurringly advancing the lowermost pair of boards 4, in end to end alinement from the hoppers 3 on the table 2 to a position shown particularly in Figs. 2 and 3, wherein said pair of boards are held down under the influence of yieldable hold-down units 19 affixed by vertically adjustable mounts 20 to one of the side beams 7 of the hoppers.

When each pair of boards 4 are advanced, as above, on the table 2, the tongued and grooved ends 8 remain in spaced-apart relation; the outer end of one of said advanced boards bearing against an end stop 21 on the table, whereas the outer end of the other board is disposed in adjacent alined relation with an initially retracted pusher or ram head 22 affixed to a longitudinal, ram slide 23 formed in the table.

The ram slide 23 is initially retracted and is arranged to reciprocate in alternating relation to reciprocation of the pusher bar 9, by means of the following mechanism:

The cross shaft 16 is fitted, on the end opposite the bevel gears 17, with a crank 24, and a longitudinal connecting rod 25 extends between the crank 4 and the ram slide 23. Thus, the cross shaft 16 serves to drive both the pusher bar 9 and the ram slide 23; the arrangement being mechanically timed so that the ram slide 23 retracts when the pusher bar 9 advances, and vice versa.

It therefore becomes evident that the mechanism is operative to recurrently advance pairs of boards laterally on the table 2 and to then forcefully ram said boards together at their adjacent ends, whereby to couple the tongued and grooved portions 8 to the end that said boards form a unitary piece. This is accomplished by the pusher or ram head 22 urging the adjacent board lengthwise toward the other board, and the other board bearing non-movably against the end stop 21.

It is of course necessary that glue be applied to one of the tongued and grooved portions 8 before the same are rammed or joined together, and this is accomplished in the following manner, and in properly timed relation to the remainder of the cycle of operations.

Beneath the ram slide 20 there is a relatively short cross shaft 26 journaled beneath the table 2 and carrying a pinion 27 which runs in mesh with a rack 28 on the under side of said ram slide 23. With this arrangement the cross shaft 26 is rotated a part turn each time that the ram slide 23 is advanced.

At one end the cross shaft 26 extends into a glue reservoir 29 suspended beneath the table generally directly below, and spanning between, the adjacent ends of the hoppers 3; there being an aperture 30 in the table 2 providing communication between the top of the glue reservoir 29 and the space which exists between the tongued and grooved portions 8 of the boards 4.

An arm 31 is fixed to and radiates from the cross shaft 26 in the glue reservoir 29, and—through the medium of a shock absorbing, arcuate spring unit 32—the arm 31 drives another arm 33 journaled in an adjacent position on the cross shaft 26. The arm 30 carries, on its outer end, a glue applying block or head 34 formed to matchingly engage the tongued and grooved end 8 of one of the lowermost boards 4 upon swinging of such arm 33 from the dotted line position to the full line position of Fig. 4. With each advance of the ram slide 23, the rack 28 and pinion 27 turn the cross shaft 26 in the direction, and a distance, to so swing the arms 31 and 33. Thus, at the same time that the pair of boards outside the hoppers are rammed or joined together, the lowermost pair still remaining in the hoppers has glue simultaneously and automatically applied to one of the tongued and grooved ends 8.

When in its lowered or retracted position the glue applying block or head 34 is submerged in glue 35 in the reservoir 29, preparatory to the next glue applying operation.

When the ram slide 23, with the pusher head 22, retracts to permit of the lateral advance of the next pair of boards on the table, the glue applying device above described likewise retracts downwardly to an out-of-the-way position, so that the pusher bar 9, as it advances the next pair of boards, can do so without obstruction.

After each pair of boards are joined together they are advanced laterally on the table 2, by the next following pairs, for subsequent handling and milling.

The described joining press makes possible the use of relatively short boards which would otherwise be of little commercial value, and as joined together these boards provide a rigid piece capable of being milled into door stiles, etc.

The machine functions in a smooth, relatively rapid manner, and its output is substantial, with little manual attention required; the attendant being required only to keep a supply of boards in the hoppers 3, and the glue reservoir 29 up to level.

From the foregoing description it will be readily seen that there has been produced such a device as will substantially fulfill the objects of the invention, as set forth herein.

While this specification sets forth in detail the present and preferred construction of the device, still in practice such deviations therefrom will be resorted to as do not form a departure from the spirit of the invention, as defined by the appended claims.

Having thus described the invention, the following is claimed as new and useful, and upon which Letters Patent are desired:

1. A joining press for boards alined endwise in initially spaced relation and formed at adjacent ends for finger jointing, the press comprising a table, a longitudinal hopper assembly above the table for a plurality of said boards, the hopper assembly being arranged to feed the boards onto the table a pair at a time in said alined, end spaced relation for lateral advancing motion on the table, pusher means operative upon reciprocation thereof to advance the table supported pair of boards laterally from the hopper to another position on the table, power mechanism operative to reciprocate the pusher means, a device operative to apply glue to at least one of the adjacent ends of each table-supported pair of boards before the same are advanced from the hopper, ram means operative to relatively shift the boards lengthwise when the same are at said other position whereby to engage the finger joint, power mechanism operative to reciprocate the ram means in predetermined timed relation to the pusher means and including a horizontal transverse shaft; the table having an aperture therein opening between the adjacent ends of said table-supported pair of boards in the hopper, a glue reservoir mounted below the aperture and into which said shaft projects, a glue applying head mounted for swinging motion from the reservoir upward through the aperture to engagement with the adjacent end of one of said table supported boards, an arm fixed with the head and turnable on the shaft, another arm fixed on the shaft back of the first named arm relative to the direction of upward swinging movement, and a normally slack compression spring connected between the arms.

2. A joining press for boards alined endwise in initially spaced relation and formed at adjacent ends for finger jointing, the press comprising a table, a longitudinal hopper assembly above the table for a plurality of said boards, the hopper assembly being arranged to feed the boards onto the table a pair at a time in said alined, end spaced relation for lateral advancing motion on the table, a pusher bar extending lengthwise to one side of the hopper assembly, means mounting the pusher bar for reciprocation transversely of the table to recurringly engage and advance the table-supported pair of boards from the hopper laterally to another position on the table, power mechanism operative to reciprocate said pusher bar, a device operative to apply glue to at least one of the adjacent ends of each table-supported pair of boards before the same are advanced from the hopper, ram means operative in a direction transversely of the pusher bar to relatively shift the boards lengthwise when the same are at said other position whereby to engage the finger joint, and power mechanism operative to reciprocate the ram means in predetermined timed relation to the pusher means; the pusher bar including separate plates projecting toward the hopper assembly for engagement with each table-supported pair of boards adjacent opposite ends thereof, and a central pusher plate projecting in the same direction from the bar for engagement with both of said pair of boards at their adjacent ends.

WALTER E. JONES.
GORDON A. NIELSEN.

References Cited in the file of this patent
UNITED STATES PATENTS

| Number | Name | Date |
|---|---|---|
| 541,103 | Mabin et al. | June 18, 1895 |
| 676,942 | Firstbrook | June 25, 1901 |
| 2,038,510 | Goff | Apr. 21, 1936 |
| 2,279,994 | Jones | Apr. 14, 1942 |
| 2,409,777 | Maurer | Oct. 22, 1946 |
| 2,548,527 | Goff | Apr. 10, 1951 |